US011016877B2

(12) United States Patent
Mestres et al.

(10) Patent No.: US 11,016,877 B2
(45) Date of Patent: May 25, 2021

(54) REMOTE VIRTUAL CODE TRACKING OF PARTICIPANT ACTIVITIES AT A WEBSITE (71) Applicant: USERZOOM TECHNOLOGIES, INC., Dover, DE (US)

(72) Inventors: Xavier Mestres, Barcelona (ES); Javier Darriba, Barcelona (ES); Alfonso de la Nuez, San Jose, CA (US); Albert Recolons, Barcelona (ES); Francesc del Castillo, Barcelona (ES)

(73) Assignee: USERZOOM TECHNOLOGIES, INC., Dover, DE (US)

( * ) Notice: Subject to any disclaimer, the term of this patent is extended or adjusted under 35 U.S.C. 154(b) by 0 days.

(21) Appl. No.: 16/879,717

(22) Filed: May 20, 2020

(65) Prior Publication Data
US 2020/0349060 A1    Nov. 5, 2020

Related U.S. Application Data

(63) Continuation of application No. 13/112,792, filed on May 20, 2011, now Pat. No. 10,691,583.

(60) Provisional application No. 61/348,431, filed on May 26, 2010.

(51) Int. Cl.
*G06Q 10/00*    (2012.01)
*G06F 11/36*    (2006.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| 4,845,665 A | 7/1989 | Heath et al. |
| 5,086,393 A | 2/1992 | Kerr |
| 5,220,658 A | 6/1993 | Kerr |
| 5,724,262 A | 3/1998 | Ghahramani |

(Continued)

FOREIGN PATENT DOCUMENTS

| AU | 2009905430 | * 11/2009 | .......... G06F 11/3688 |
| GB | 2470838 A | * 12/2010 | ............... G06F 8/30 |

(Continued)

OTHER PUBLICATIONS

Atterer R et al. : "Knowing the User's Every Move—User Activity Tracking for Website Usability Evaluation and Implicit Interaction," WWW '06 Proceedings of the 15th World Wide Web, ACM, New York, NY, USA, May 22, 2006, pp. 203-212 (May 22, 2006). (Year: 2006).*

(Continued)

*Primary Examiner* — Hafiz A Kassim
(74) *Attorney, Agent, or Firm* — Kang S. Lim (57) ABSTRACT

A remote website participant activity tracker accesses, at a participant device, codes including a virtual tracking code, a task display code, a response collection code, and a card-sorting redirection code. The task display code includes a plurality of tasks associated with a target website displayed at the participant device. The plurality of tasks includes one or more card sorting study for optimizing an architecture and a layout of the target web site. The card sorting study can be randomized to save time and cost.

12 Claims, 8 Drawing Sheets

(56) References Cited

U.S. PATENT DOCUMENTS

| | | | |
|---|---|---|---|
| 5,808,908 A | 9/1998 | Ghahramani | |
| 6,237,138 B1 | 5/2001 | Hameluck | |
| 6,526,526 B1* | 2/2003 | Dong | G06F 11/3438 714/46 |
| 6,738,082 B1* | 5/2004 | Dong | G06F 16/355 715/769 |
| 6,741,967 B1* | 5/2004 | Wu | G06Q 30/02 705/1.1 |
| 6,859,784 B1* | 2/2005 | van Duyne | G06Q 30/0203 463/17 |
| 6,895,437 B1* | 5/2005 | Cowdrey | G06F 11/3495 709/202 |
| 7,222,078 B2 | 5/2007 | Abelow | |
| 7,437,563 B2* | 10/2008 | Vaha-Sipila | G06F 21/51 455/410 |
| 7,587,484 B1 | 9/2009 | Smith | |
| 7,647,339 B2* | 1/2010 | Gonzalez | G06F 16/958 707/999.107 |
| 7,720,737 B2* | 5/2010 | D'Alessandro | G06Q 10/06393 705/36 R |
| 7,752,535 B2* | 7/2010 | Satyavolu | G06F 16/9535 715/205 |
| 7,770,143 B2* | 8/2010 | Hughes | G06Q 10/101 716/110 |
| 7,941,525 B1* | 5/2011 | Yavilevich | H04L 67/02 709/224 |
| 8,109,819 B2* | 2/2012 | Hughes | G06Q 30/0275 463/9 |
| 8,214,804 B2* | 7/2012 | Robertson | G06Q 10/06 717/124 |
| 8,622,798 B2* | 1/2014 | Lockton | A63F 13/30 463/9 |
| 8,892,543 B1 | 11/2014 | Kapoor | |
| 2001/0049084 A1 | 12/2001 | Mitry | |
| 2002/0029162 A1* | 3/2002 | Mascarenhas | G06F 16/9535 705/7.32 |
| 2002/0143931 A1* | 10/2002 | Smith | G06F 11/2294 709/224 |
| 2002/0178163 A1* | 11/2002 | Mayer | G06F 16/951 |
| 2002/0194053 A1 | 12/2002 | Barrett | |
| 2002/0196277 A1 | 12/2002 | Bushey | |
| 2003/0046057 A1 | 3/2003 | Okunishi | |
| 2003/0163365 A1* | 8/2003 | Farnes | G06Q 10/1097 705/7.21 |
| 2004/0015867 A1 | 1/2004 | Macko | |
| 2004/0177002 A1 | 9/2004 | Abelow | |
| 2005/0254775 A1* | 11/2005 | Hamilton | G06F 11/3476 386/210 |
| 2006/0004703 A1* | 1/2006 | Spivack | G06F 16/93 |
| 2006/0184917 A1 | 8/2006 | Troan | |
| 2006/0271856 A1* | 11/2006 | Raymond | G06F 8/38 715/730 |
| 2007/0005417 A1* | 1/2007 | Desikan | G06Q 30/0265 705/14.49 |
| 2007/0209010 A1* | 9/2007 | West | G06F 11/3612 715/762 |
| 2007/0239729 A1* | 10/2007 | Giallanza | G06F 16/954 |
| 2008/0005793 A1* | 1/2008 | Wenig | G06F 11/3476 726/22 |
| 2008/0046562 A1* | 2/2008 | Butler | G06F 16/958 709/224 |
| 2008/0184129 A1* | 7/2008 | Cancel | G06Q 30/02 715/741 |
| 2008/0313010 A1* | 12/2008 | Jepson | G06Q 30/0243 705/7.32 |
| 2008/0313149 A1 | 12/2008 | Li | |
| 2008/0313617 A1 | 12/2008 | Zhu | |
| 2008/0313633 A1 | 12/2008 | Zhu | |
| 2009/0083714 A1* | 3/2009 | Kiciman | G06F 8/658 717/128 |
| 2009/0138292 A1 | 5/2009 | Dusi | |
| 2009/0150814 A1* | 6/2009 | Eyer | G06F 9/451 715/765 |
| 2009/0172551 A1* | 7/2009 | Kane | G06Q 30/02 715/733 |
| 2009/0204573 A1* | 8/2009 | Neuneier | G06F 11/3438 |
| 2009/0210282 A1* | 8/2009 | Elenbaas | G06Q 10/06 705/7.13 |
| 2009/0228474 A1* | 9/2009 | Chiu | G06F 16/9024 |
| 2009/0281819 A1 | 11/2009 | Garg | |
| 2009/0281852 A1 | 11/2009 | Abhari et al. | |
| 2010/0030792 A1 | 2/2010 | Swinton et al. | |
| 2010/0057514 A1* | 3/2010 | Chee | G06Q 50/188 705/80 |
| 2010/0076847 A1* | 3/2010 | Heller | G06Q 30/02 705/14.53 |
| 2010/0094901 A1* | 4/2010 | Edwards | G06F 16/358 707/772 |
| 2010/0095208 A1 | 4/2010 | White et al. | |
| 2010/0223290 A1* | 9/2010 | Almeida | G06Q 30/06 707/770 |
| 2010/0262461 A1* | 10/2010 | Bohannon | G06Q 20/02 705/38 |
| 2010/0313183 A1* | 12/2010 | Ellen | G06F 8/30 717/110 |
| 2011/0040831 A1* | 2/2011 | Payne | G06Q 30/02 709/203 |
| 2011/0138009 A1* | 6/2011 | Grover | G06F 3/011 709/217 |
| 2011/0166884 A1 | 7/2011 | Lesselroth | |
| 2011/0314092 A1 | 12/2011 | Lunt et al. | |
| 2012/0078660 A1 | 3/2012 | Mangicaro | |
| 2012/0210209 A1* | 8/2012 | Biddle | G06F 11/3688 715/234 |
| 2013/0132833 A1 | 5/2013 | White | |
| 2013/0254735 A1 | 9/2013 | Sakhardande | |
| 2014/0052853 A1 | 2/2014 | Mestres | |
| 2014/0189054 A1 | 7/2014 | Snider et al. | |
| 2016/0063449 A1* | 3/2016 | Duggan | G06Q 10/1095 705/7.19 |

FOREIGN PATENT DOCUMENTS

| | | | |
|---|---|---|---|
| WO | WO 2001024057 | 4/2001 | |
| WO | WO-0208903 A2 * | 1/2002 | G06Q 30/02 |
| WO | WO-2011054024 A1 * | 5/2011 | G06F 11/3688 |

OTHER PUBLICATIONS

Carroll, Marty, "Usability and Web analytics: ROI justification for an Internet strategy," Interactive Marketing, vol. 4, No. 3, pp. 223-234, The Usability Company, Jan./Mar. 2003. (Year: 2003).*

Jason I. Hong, Jeffrey Heer, Sarah Waterson, and James A. Landay (WebQuilt: A Proxy-based Approach to Remote Web Usability Testing, ACM Transactions on Information Systems, vol. 19, No. 3, Jul. 2001, pp. 263-285)). (Year: 2001).*

Celeste Lyn Paul (A Modified Delphi Approach to a New Card Sorting Methodology, Journal of Usability studies, vol. 4, Issue 1, Nov. 2008, pp. 7-30). (Year: 2005).*

Dennis Wixon (The Usability Engineering Framework for Product Design and Evaluation, Handbook of Human-Computer Interaction, Second, completely revised edition M. Helander, TK. Landauer, P. Prabhu (eds.) © 1997 Elsevier Science B.V.). (Year: 1997).*

Steven Hannah et al. (Sorting Out Card Sorting: Comparing Methods for Information Architects, Usability Specialists, and Other Practitioners, Jun. 2005). (Year: 2005).*

19. Laurie Kantner, Deborah Hinderer Sova, and Stephanie Rosenbaum et al. (Alternative Methods for Field Usability Research, SIGDOC'03, Oct. 12-15, 2003). (Year: 2003).*

User-Centred Library Websites: Usability Evaluation Methods by Carole George, Edition:2008.

Richard Atterer, Monika Wnuk, and Albrecht Schmidt (Knowing the User's Every Move—User Activity Tracking for Website Usability Evaluation and Implicit Interaction, International World Wide (56) References Cited

OTHER PUBLICATIONS

Web Conference Committee, May 23-26, 2006, Edinburgh, Scotland). (Year:2006).

* cited by examiner

FIG. 4 ved or mentioned otherwise -->

REMOTE VIRTUAL CODE TRACKING OF PARTICIPANT ACTIVITIES AT A WEBSITE

CROSS-REFERENCES TO RELATED APPLICATIONS

This application is a continuation application and claims priority to U.S. application Ser. No. 13/112,792, filed May 20, 2011, of the same title, recently allowed, which application claims priority to U.S. provisional application No. 61/348,431, filed May 26, 2010, of the same title, by inventors Mestres et al., the contents of which are incorporated herein by reference in their entirety.

BACKGROUND

The present invention relates to computer systems and more particularly to gathering usability data for a web site.

The Internet provides new opportunities for business entities to reach customers via web sites that promote and describe their products or services. Often, the appeal of a web site and its ease of use may affect a potential buyer's decision to purchase the product/service.

Assessing the appeal, user friendliness, and effectiveness of a web site is of substantial value to marketing managers, web site designers and user experience specialists but is unfortunately difficult to obtain. Focus groups are sometimes used to achieve this goal but the process is long, expensive and not reliable, in part, due to the size and demographics of the focus group that may not be representative of the target customer base.

Therefore, there is a need to provide a low cost, quick and reliable way of gathering usability data using the Internet.

SUMMARY

In an embodiment of the present invention, a method of performing usability testing of a target web site includes identifying a group of participants, each participant is equipped with a data processing unit having a display screen and running a web browsing software program. The method further includes inserting a proprietary program code to each of the group of participants' web browsing software program for tracking their interaction with the website or mockup. In addition, the method includes automatically presenting questions and/or tasks to the group of participants; and gathering responses or reactions from each participant using a computer system. Furthermore, the method includes sending the participant's responses to a data collecting server comprising a validation module configured to validate the gathered responses and a binning module configured to store the validated responses into multiple categories.

In another embodiment, the displayed web site is not the original target web site but a modified one. In an embodiment, a tracking code is added to a web page that is being downloaded by a participant. The tracking code may be a JavaScript code executed by the data processing unit. In yet another embodiment, not the answers of the entire group of participants will be analyzed. Certain participants will be eliminated based on a predefined list of qualification rules. For example, participants can be selected based on their gender, age, education, income, personal interests, and the like.

In an embodiment of the present invention, a computer-aided method of performing usability testing of a target web site includes modifying a current software of the target web site by adding a proprietary program code to it and selecting a group of participants based on a list of predefined selection criteria. Further, the method includes automatically presenting questions from a predefined list of questions to the selected participants and gathering answers of the selected participants related to the questions from the predefined list of questions, wherein the predefined list of questions is related to a usability metric of the target web site.

In an embodiment of the present invention, a system for performing remote usability testing of a software application includes a module for generating and storing particular tasks and a module for moderating a session (or a moderating session module) with a number of remote participants. The system further includes a module for receiving usability data. Additionally, the system includes a module for analyzing the received usability data. In an embodiment, the module for generating and storing the particular tasks includes a research server configured to interface with user experience researchers who may create multiple testing modules for selecting qualified participants from the number of participants and for generating the particular tasks having research metrics associated with a target web site. In an embodiment, the selection of qualified participants can be performed by profiling the number of participants. In another embodiment, the research server may randomly assign one of the multiple testing modules to one or more of the number of participants. In yet another embodiment, the multiple testing modules may include card sorting studies for optimizing a web site's architecture or layout.

In an embodiment, the moderating session module interacts with the remote participants via a browser, which may be configured to transmit a plurality of browser events generated by the number of participants. The moderating session module may be embedded in a moderator server that may be linked to a study content database and/or a behavioral database. In an embodiment, the browser may include a proprietary software program code. In an embodiment, the downloaded target web site is being modified in real-time with a proprietary tracking code, and the browsing events such as clicks, scrolls, key strokes will be gathered during a period of time. In another embodiment, the browser is a standard browser such as Microsoft Internet Explorer™, Chrome™ or Firefox™, and the target web site contains a proprietary tracking code.

In another embodiment of the present invention, a device for gathering usability data includes a module adapted to present a list of predefined tasks to a participant. The module is further adapted to gather the participant's responses related to the list of predefined tasks and send the gathered responses to a data collection server. In an embodiment, the list of predefined tasks includes tasks of determining content and usability of a target web site, and the web site may be modified in real-time with a virtual tracking code while being downloaded to the participant. The virtual tracking code may be a proprietary Javascript code.

In yet another embodiment of the present invention, a program stored on a computer readable medium includes codes for presenting a list of predefined tasks to a participant, codes for gathering the participant's responses associated with the list of predefined tasks, and codes for analyzing participant's responses.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

In the following it is understood that the term usability refers to a metric scoring value for judging the ease of use of a target web site. A client refers to a sponsor who initiates and/or finances the usability study. The client may be, for example, a marketing manager who seeks to test the usability of a commercial web site for marketing (selling or advertising) certain products or services. Participants may be a selected group of people who participate in the usability study and may be screened based on a predetermined set of questions. Remote usability testing or remote usability study refers to testing or study in accordance with which participants (referred to use their computers, mobile devices or otherwise) access a target web site in order to provide feedback about the web site's ease of use, connection speed, and the level of satisfaction the participant experiences in using the web site. Unmoderated usability testing refers to communication with test participants without a moderator, e.g., a software, hardware, or a combined software/hardware system can automatically gather the participants' feedback and records their responses. The system can test a target web site by asking participants to view the web site, perform test tasks, and answer questions associated with the tasks.

Figure 1A:
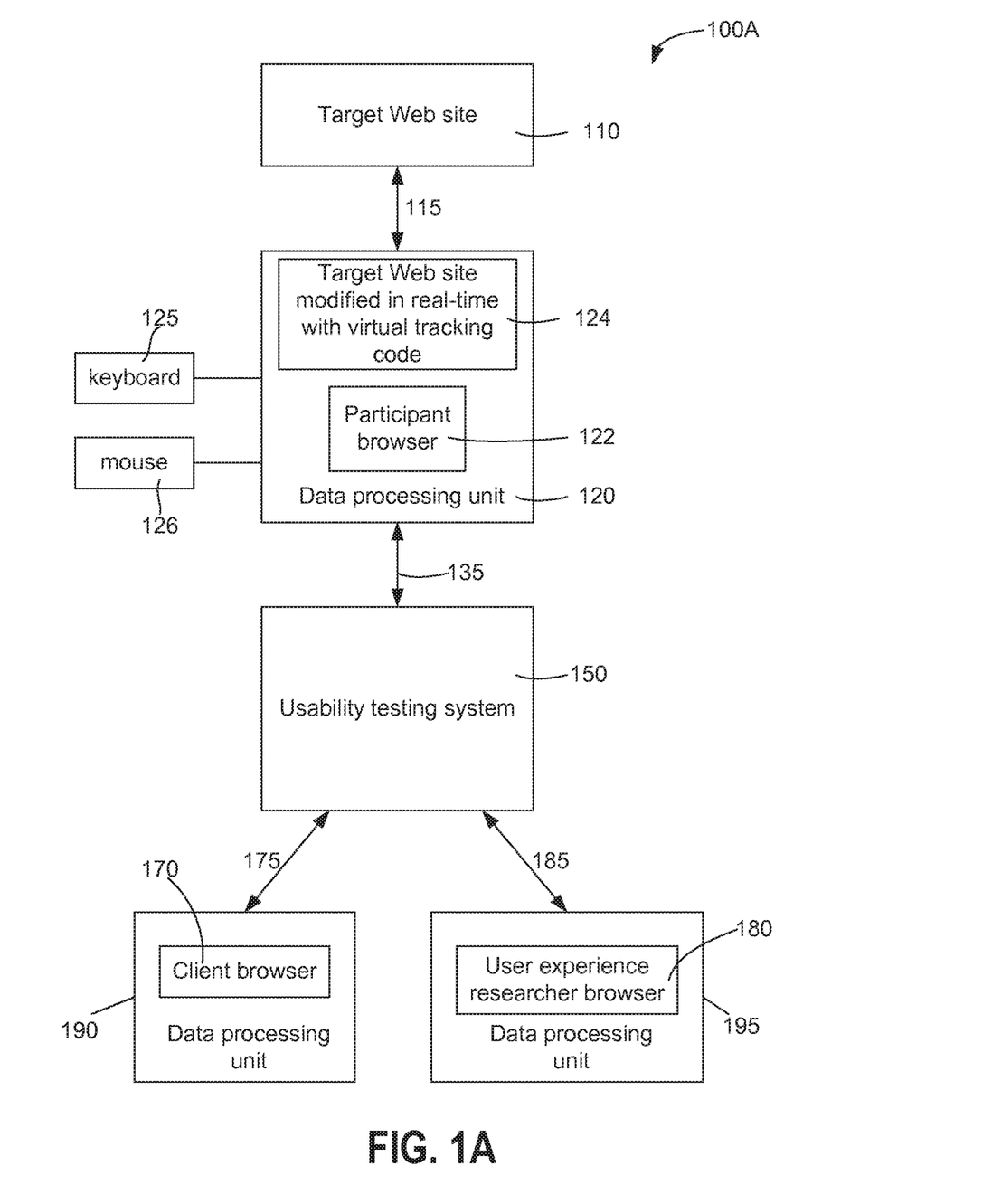
FIG. 1A is a simplified block diagram illustrating an embodiment of the present invention.

FIG. 1A is a simplified block diagram of a user testing platform 100A according to an embodiment of the present invention. Platform 100A is adapted to test a target web site 110. Platform 100A is shown as including a usability testing system 150 that is in communications with data processing units 120, 190 and 195. Data processing units 120, 190 and 195 may be a personal computer equipped with a monitor, a handheld device such as a tablet PC, an electronic notebook, a wearable device such as a cell phone, or a smart phone.

Data processing unit 120 includes a browser 122 that enables a user (e.g., usability test participant) using the data processing unit 120 to access target web site 110. Data processing unit 120 includes, in part, an input device such as a keyboard 125 or a mouse 126, and a participant browser 122. In one embodiment, data processing unit 120 may insert a virtual tracking code to target web site 110 in real-time while the target web site is being downloaded to the data processing unit 120. The virtual tracking code may be a proprietary JavaScript code, whereby the run-time data processing unit interprets the code for execution. The tracking code collects participants' activities on the downloaded web page such as the number of clicks, key strokes, keywords, scrolls, time on tasks, and the like over a period of time. Data processing unit 120 simulates the operations performed by the tracking code and is in communication with usability testing system 150 via a communication link 135. Communication link 135 may include a local area network, a metropolitan area network, a wide area network. Such a communication link may be established through a physical wire or wirelessly. For example, the communication link may be established using an Internet protocol such as the TCP/IP protocol. Activities of the participants associated with target web site 110 are collected and sent to usability testing system 150 via communication link 135. In one embodiment, data processing unit 120 may instruct a participant to perform predefined tasks on the downloaded web site during a usability test session, in which the participant evaluates the web site based on a series of usability tests. The virtual tracking code (i.e., a proprietary JavaScript) may record the participant's responses (such as the number of mouse clicks) and the time spent in performing the predefined tasks. The usability testing may also include gathering performance data of the target web site such as the ease of use, the connection speed, the satisfaction of the user experience. Because the web page is not modified on the original web site, but on the downloaded version in the participant data processing unit, the usability can be tested on any web sites including competitions' web sites.

All data collected by data processing unit 120 may be sent to the usability testing system 150 via communication link 135. In an embodiment, usability testing system 150 is further accessible by a client via a client browser 170 running on data processing unit 190. Usability testing system 150 is further accessible by user experience researcher browser 180 running on data processing unit 195. Client browser 170 is shown as being in communications with usability testing system 150 via communication link 175. User experience research browser 180 is shown as being in communications with usability testing system 150 via communications link 185. A client and/or user experience researcher may design one or more sets of questionnaires for screening participants and for testing the usability of a web site. Usability testing system 150 is described in detail below.

Figure 1B:
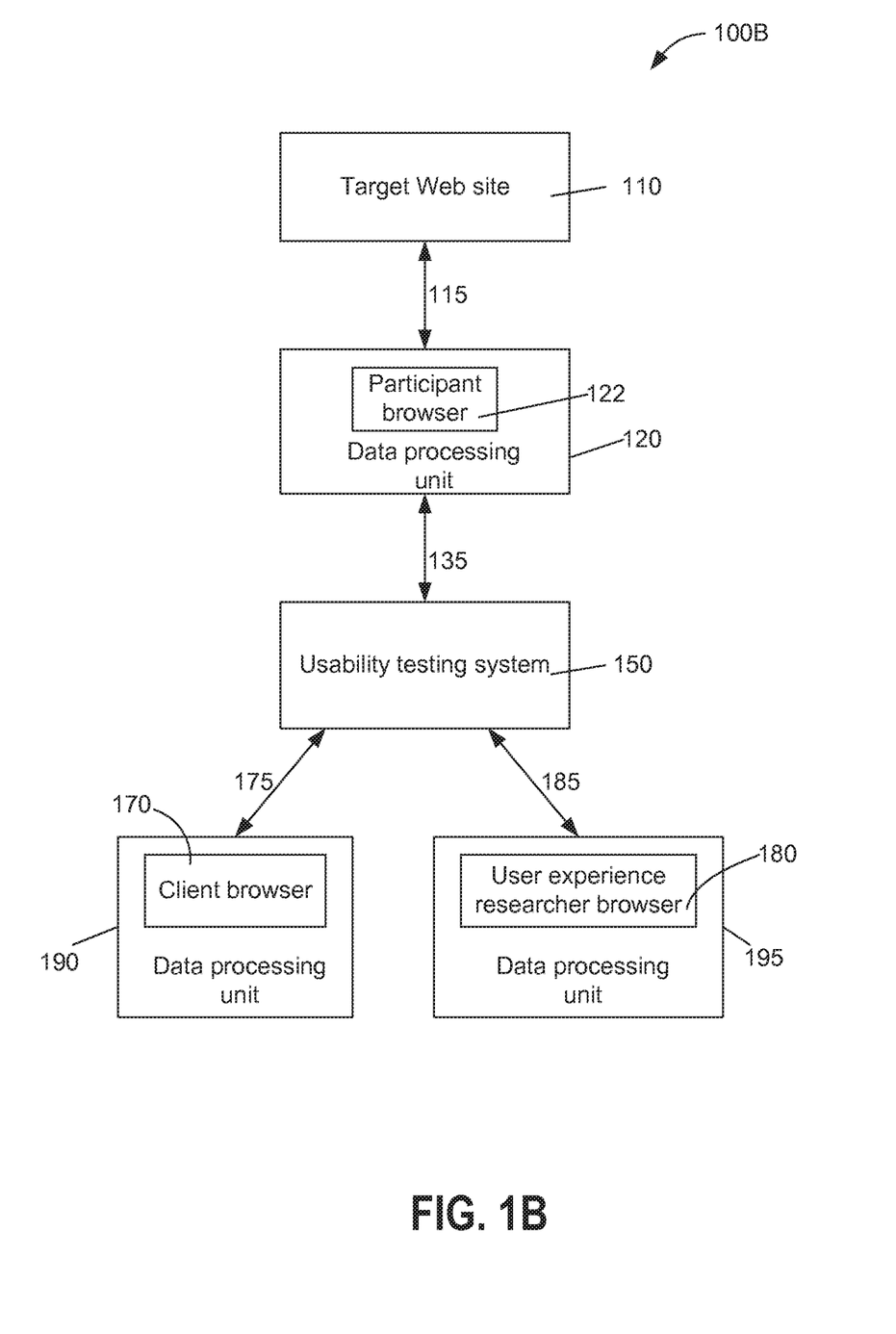
FIG. 1B is a simplified block diagram illustrating another embodiment of the present invention.

FIG. 1B is a simplified block diagram of a user testing platform 100B according to another embodiment of the present invention. Platform 100B is shown as including a target web site 110 being tested by one or more participants using a standard web browser 122 running on data processing unit 120 equipped with a display. Participants may communicate with a usability test system 150 via a communication link 135. Usability test system 150 may communicate with a client browser 170 running on a data processing unit 190. Likewise, usability test system 150 may communicate with user experience researcher browser running on data processing unit 195. Although a data processing unit is illustrated, one of skill in the art will appreciate that data processing unit 120 may include a configuration of multiple single-core or multi-core processors configured to process instructions, collect usability test data (e.g., number of clicks, mouse movements, time spent on each web page, connection speed, and the like), store and transmit the collected data to the usability testing system, and display graphical information to a participant via an input/output device (not shown).

Figure 1C:
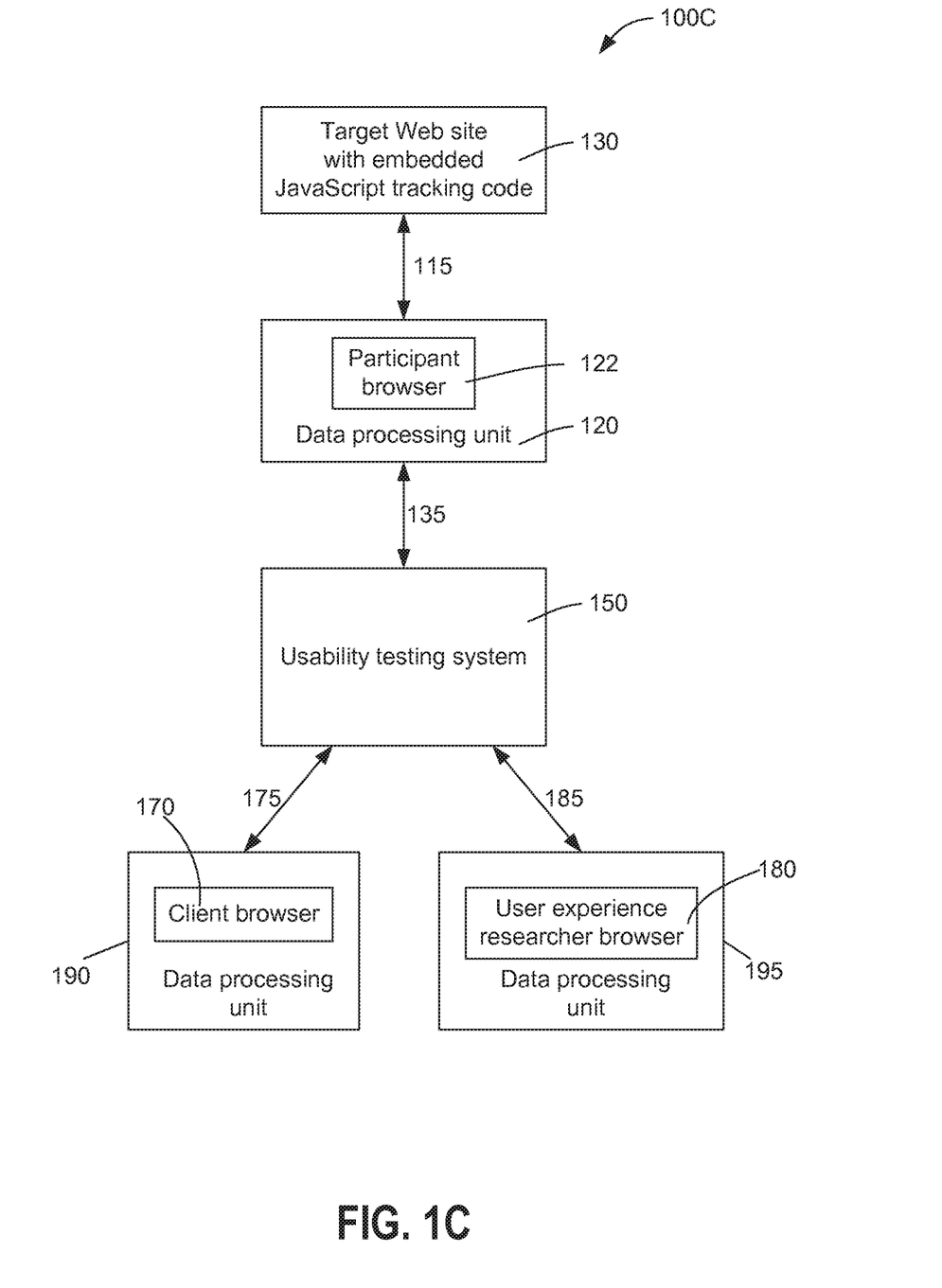
FIG. 1C is a simplified block diagram illustrating yet another embodiment of the present invention.

FIG. 1C is a simplified block diagram of a user testing platform 100C according to yet another embodiment of the present invention. Platform 100C is shown as including a target web site 130 being tested by one or more participants using a standard web browser 122 running on data processing unit 120 having a display. The target web site 130 is shown as including a tracking program code configured to track actions and responses of participants and send the tracked actions/responses back to the participant's data processing unit 120 through a communication link 115. Communication link 115 may be computer network, a virtual private network, a local area network, a metropolitan area network, a wide area network, and the like. In one embodiment, the tracking program is a JavaScript configured to run tasks related to usability testing and sending the test/study results back to participant's data processing unit for display such embodiments advantageously enable clients using client browser 170 as well as user experience researchers using user experience research browser 180 to design mockups or prototypes for usability testing of variety of web site layouts. Data processing unit 120 may collect data associated with the usability of the target web site and send the collected data to the usability testing system 150 via a communication link 135.

In one exemplary embodiment, the testing of the target web site (page) may provide data such as ease of access through the Internet, its attractiveness, ease of navigation, the speed with which it enables a user to complete a transaction, and the like. In another exemplary embodiment, the testing of the target web site provides data such as duration of usage, the number of keystrokes, the user's profile, and the like. It is understood that testing of a web site in accordance with embodiments of the present invention can provide other data and usability metrics.

Information collected by the participant's data processing unit is uploaded to usability testing system 150 via communication link 135 for storage and analysis.

Figure 2:
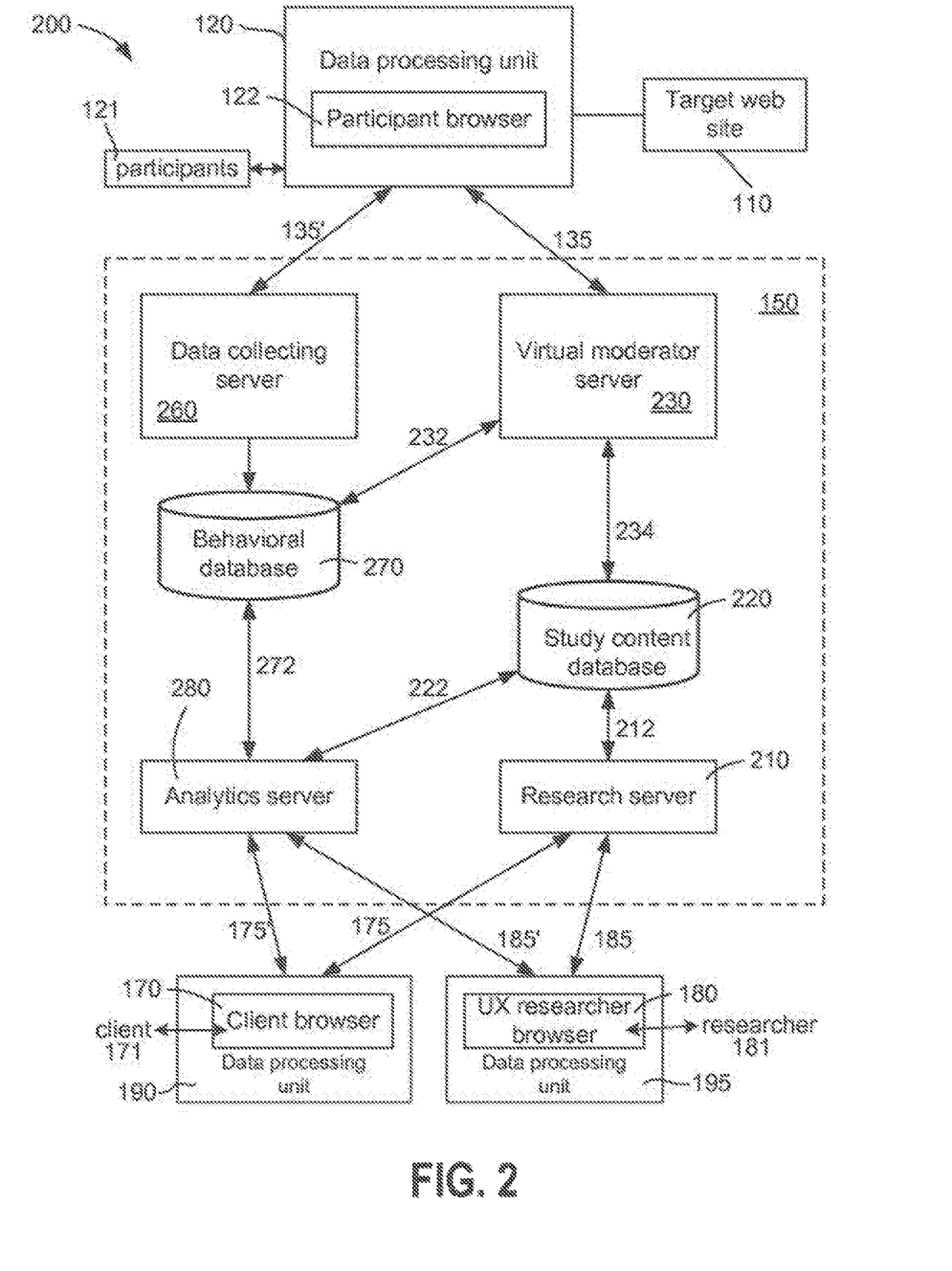
FIG. 2 is a simplified block diagram illustrating an exemplary platform according to an embodiment of the present invention.

FIG. 2 is a simplified block diagram of an exemplary embodiment platform 200 according to one embodiment of the present invention. Platform 200 is shown as including, in part, a usability testing system 150 being in communications with a data processing unit 125 via communications links 135 and 135'. Data processing unit 125 includes, in part, a participant browser 120 that enables a participant to access a target web site 110. Data processing unit 125 may be a personal computer, a handheld device, such as a cell phone, a smart phone or a tablet PC, or an electronic notebook. Data processing unit 125 may receive instructions and program codes from usability testing system 150 and display predefined tasks to participants 120. The instructions and program codes may include a web-based application that instructs participant browser 122 to access the target web site 110. In one embodiment, a tracking code is inserted to the target web site 110 that is being downloaded to data processing unit 125. The tracking code may be a JavaScript code that collects participants' activities on the downloaded target web site such as the number of clicks, key strokes, movements of the mouse, keywords, scrolls, time on tasks and the like performed over a period of time.

Data processing unit 125 may send the collected data to usability testing system 150 via communication link 135' which may be a local area network, a metropolitan area network, a wide area network, and the like and enable usability testing system 150 to establish communication with data processing unit 125 through a physical wire or wirelessly using a packet data protocol such as the TCP/IP protocol or a proprietary communication protocol.

Usability testing system 150 includes a virtual moderator software module running on a virtual moderator server 230 that conducts interactive usability testing with a usability test participant via data processing unit 125 and a research module running on a research server 210 that may be connected to a user research experience data processing unit 195. User experience researcher 181 may create tasks relevant to the usability study of a target web site and provide the created tasks to the research server 210 via a communication link 185. One of the tasks may be a set of questions designed to classify participants into different categories or to prescreen participants. Another task may be, for example, a set of questions to rate the usability of a target web site based on certain metrics such as ease of navigating the web site, connection speed, layout of the web page, ease of finding the products (e.g., the organization of product indexes). Yet another task may be a survey asking participants to press a "yes" or "no" button or write short comments about participants' experiences or familiarity with certain products and their satisfaction with the products. All these tasks can be stored in a study content database 220, which can be retrieved by the virtual moderator module running on virtual moderator server 230 to forward to participants 120. Research module running on research server 210 can also be accessed by a client (e.g., a sponsor of the usability test) 171 who, like user experience researchers 181, can design her own questionnaires since the client has a personal interest to the target web site under study. Client 171 can work together with user experience researchers 181 to create tasks for usability testing. In an embodiment, client 171 can modify tasks or lists of questions stored in the study content database 220. In another embodiment, client 171 can add or delete tasks or questionnaires in the study content database 220. In yet another embodiment, client 171 may be user experience researcher 181.

In one embodiment, one of the tasks may be open or closed card sorting studies for optimizing the architecture and layout of the target web site. Card sorting is a technique that shows how online users organize content in their own mind. In an open card sort, participants create their own names for the categories. In a closed card sort, participants are provided with a predetermined set of category names. Client 171 and/or user experience researcher 181 can create proprietary online card sorting tool that executes card sorting exercises over large groups of participants in a rapid and cost-effective manner. In an embodiment, the card sorting exercises may include up to 100 items to sort and up to 12 categories to group. One of the tasks may include categorization criteria such as asking participants questions "why do you group these items like this?." Research module on research server 210 may combine card sorting exercises and online questionnaire tools for detailed taxonomy analysis. In an embodiment, the card sorting studies are compatible with SPSS applications.

In an embodiment, the card sorting studies can be assigned randomly to participant 120. User experience (UX) researcher 181 and/or client 171 may decide how many of those card sorting studies each participant is required to complete. For example, user experience researcher 181 may create a card sorting study within 12 tasks, group them in 4 groups of 3 tasks and manage that each participant just has to complete one task of each group.

After presenting the thus created tasks to participants 120 through virtual moderator module (running on virtual moderator server 230) and communication link 135, the actions/responses of participants will be collected in a data collecting module running on a data collecting server 260 via a communication link 135'. In an embodiment, communication link 135' may be a distributed computer network and share the same physical connection as communication link 135. This is, for example, the case where data collecting module 260 locates physically close to virtual moderator module 230, or if they share the usability testing system's processing hardware. In the following description, software modules running on associated hardware platforms will have the same reference numerals as their associated hardware platform. For example, virtual moderator module will be assigned the same reference numeral as the virtual moderator server 230, and likewise data collecting module will have the same reference numeral as the data collecting server 260.

Data collecting module 260 may include a sample quality control module that screens and validates the received responses, and eliminates participants who provide incorrect responses, or do not belong to a predetermined profile, or do not qualify for the study. Data collecting module 260 may include a "binning" module that is configured to classify the validated responses and stores them into corresponding categories in a behavioral database 270. Merely as an example, responses may include gathered web site interaction events such as clicks, keywords, URLs, scrolls, time on task, navigation to other web pages, and the like. In one embodiment, virtual moderator server 230 has access to behavioral database 270 and uses the content of the behavioral database to interactively interface with participants 120. Based on data stored in the behavioral database, virtual moderator server 230 may direct participants to other pages of the target web site and further collect their interaction inputs in order to improve the quantity and quality of the collected data and also encourage participants' engagement. In one embodiment, virtual moderator server may eliminate one or more participants based on data collected in the behavioral database. This is the case if the one or more participants provide inputs that fail to meet a predetermined profile.

Usability testing system 150 further includes an analytics module 280 that is configured to provide analytics and reporting to queries coming from client 171 or user experience (UX) researcher 181. In an embodiment, analytics module 280 is running on a dedicated analytics server that offloads data processing tasks from traditional servers. Analytics server 280 is purpose-built for analytics and reporting and can run queries from client 171 and/or user experience researcher 181 much faster (e.g., 100 times faster) than conventional server system, regardless of the number of clients making queries or the complexity of queries. The purpose-built analytics server 280 is designed for rapid query processing and ad hoc analytics and can deliver higher performance at lower cost, and, thus provides a competitive advantage in the field of usability testing and reporting and allows a company such as UserZoom (or Xperience Consulting, SL) to get a jump start on its competitors.

In an embodiment, research module 210, virtual moderator module 230, data collecting module 260, and analytics server 280 are operated in respective dedicated servers to provide higher performance. Client (sponsor) 171 and/or user experience research 181 may receive usability test reports by accessing analytics server 280 via respective links 175' and/or 185'. Analytics server 280 may communicate with behavioral database via a two-way communication link 272.

In an embodiment, study content database 220 may include a hard disk storage or a disk array that is accessed via iSCSI or Fibre Channel over a storage area network. In an embodiment, the study content is provided to analytics server 280 via a link 222 so that analytics server 280 can retrieve the study content such as task descriptions, question texts, related answer texts, products by category, and the like, and generate together with the content of the behavioral database 270 comprehensive reports to client 171 and/or user experience researcher 181.

Shown in FIG. 2 is a connection 232 between virtual moderator server 230 and behavioral database 270. Behavioral database 270 can be a network attached storage server or a storage area network disk array that includes a two-way communication via link 232 with virtual moderator server 230. Behavioral database 270 is operative to support virtual moderator server 230 during the usability testing session. For example, some questions or tasks are interactively presented to the participants based on data collected. It would be advantageous to the user experience researcher to set up specific questions that enhance the usability testing if participants behave a certain way. If a participant decides to go to a certain web page during the study, the virtual moderator server 230 will pop up corresponding questions related to that page; and answers related to that page will be received and screened by data collecting server 260 and categorized in behavioral database server 270. In some embodiments, virtual moderator server 230 operates together with data stored in the behavioral database to proceed to the next steps. Virtual moderator server, for example, may need to know whether a participant has successfully completed a task, or based on the data gathered in behavioral database 270, present another tasks to the participant.

Referring still to FIG. 2, client 171 and user experience researcher 181 may provide one or more sets of questions associated with a target web site to research server 210 via respective communication link 175 and 185. Research server 210 stores the provided sets of questions in a study content database 220 that may include a mass storage device, a hard disk storage or a disk array being in communication with research server 210 through a two-way interconnection link 212. The study content database may interface with virtual moderator server 230 through a communication link 234 and provides one or more sets of questions to participants via virtual moderator server 230.

Figure 3A:
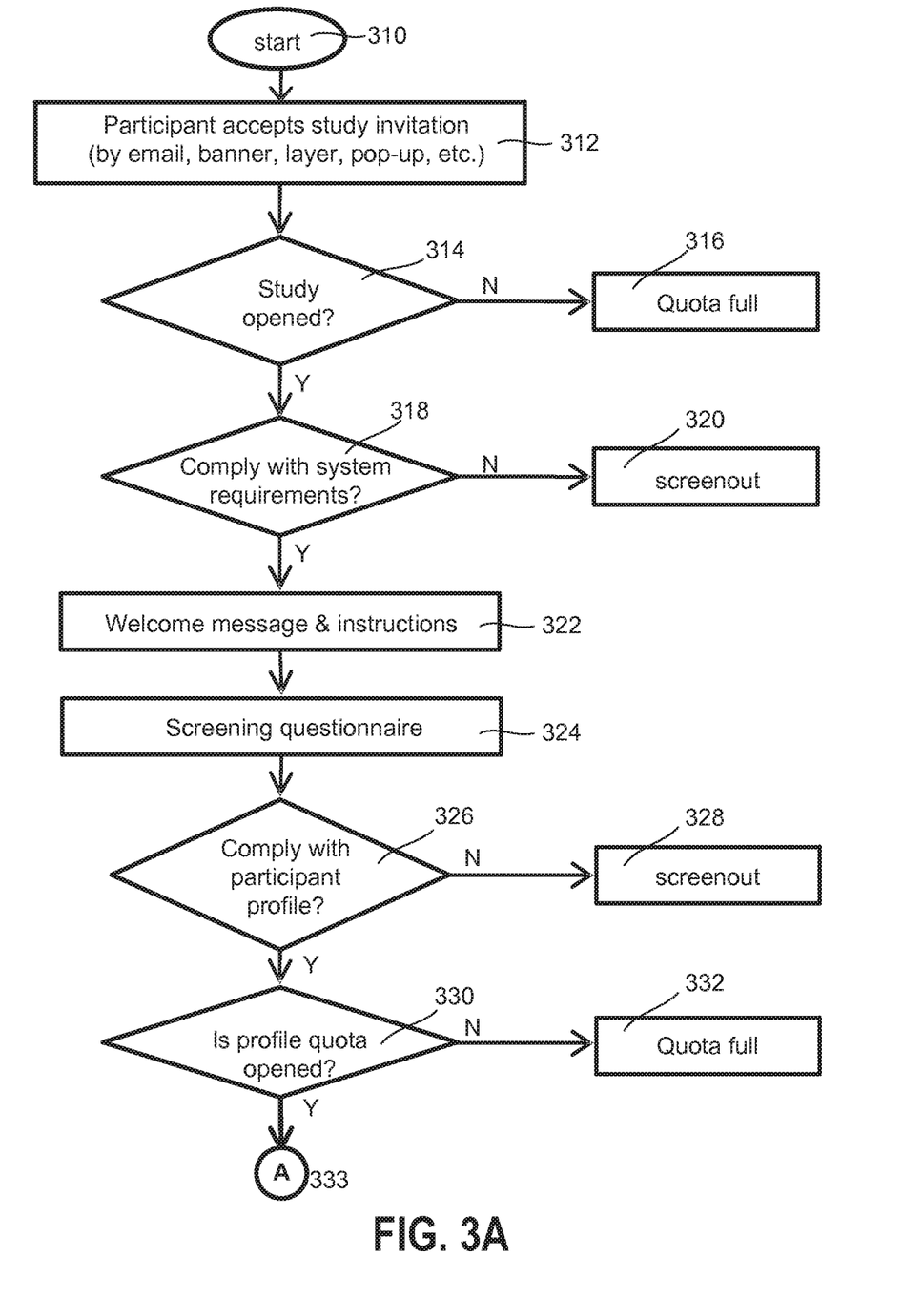
FIG. 3A is a flow diagram illustrating an exemplary process of interfacing with potential candidates and pre-screening participants for the usability testing according to an embodiment of the present invention.

FIG. 3A is a flow diagram of an exemplary process of interfacing with potential candidates and prescreening participants for the usability testing according to one embodiment of the present invention. The process starts at step 310. Initially, potential candidates for the usability testing may be recruited by email, advertisement banners, pop-ups, text layers, overlays, and the like (step 312). The number of candidates who have accepted the invitation to the usability test will be determined at step 314. If the number of candidates reaches a predetermined target number, then other candidates who have signed up late may be prompted with a message thanking for their interest and that they may be considered for a future survey (shown as "quota full" in step 316). At step 318, the usability testing system further determines whether the participants' browser comply with a target web site browser. For example, user experience researchers or the client may want to study and measure a web site's usability with regard to a specific web browser (e.g., Microsoft Internet Explorer) and reject all other browsers. Or in other cases, only the usability data of a web site related to Opera or Chrome will be collected, and Microsoft IE or FireFox will be rejected at step 320. At step 322, participants will be prompted with a welcome message and instructions are presented to participants that, for example, explain how the usability testing will be performed, the rules to be followed, and the expected duration of the test, and the like. At step 324, one or more sets of screening questions may be presented to collect profile information of the participants. Questions may relate to participants' experience with certain products, their awareness with certain brand names, their gender, age, education level, income, online buying habits, and the like. At step 326, the system further eliminates participants based on the collected information data. For example, only participants who have used the products under study will be accepted or screened out (step 328). At step 330, a quota for participants having a target profile will be determined. For example, half of the participants must be female, and they must have online purchase experience or have purchased products online in recent years.

Figure 3B:
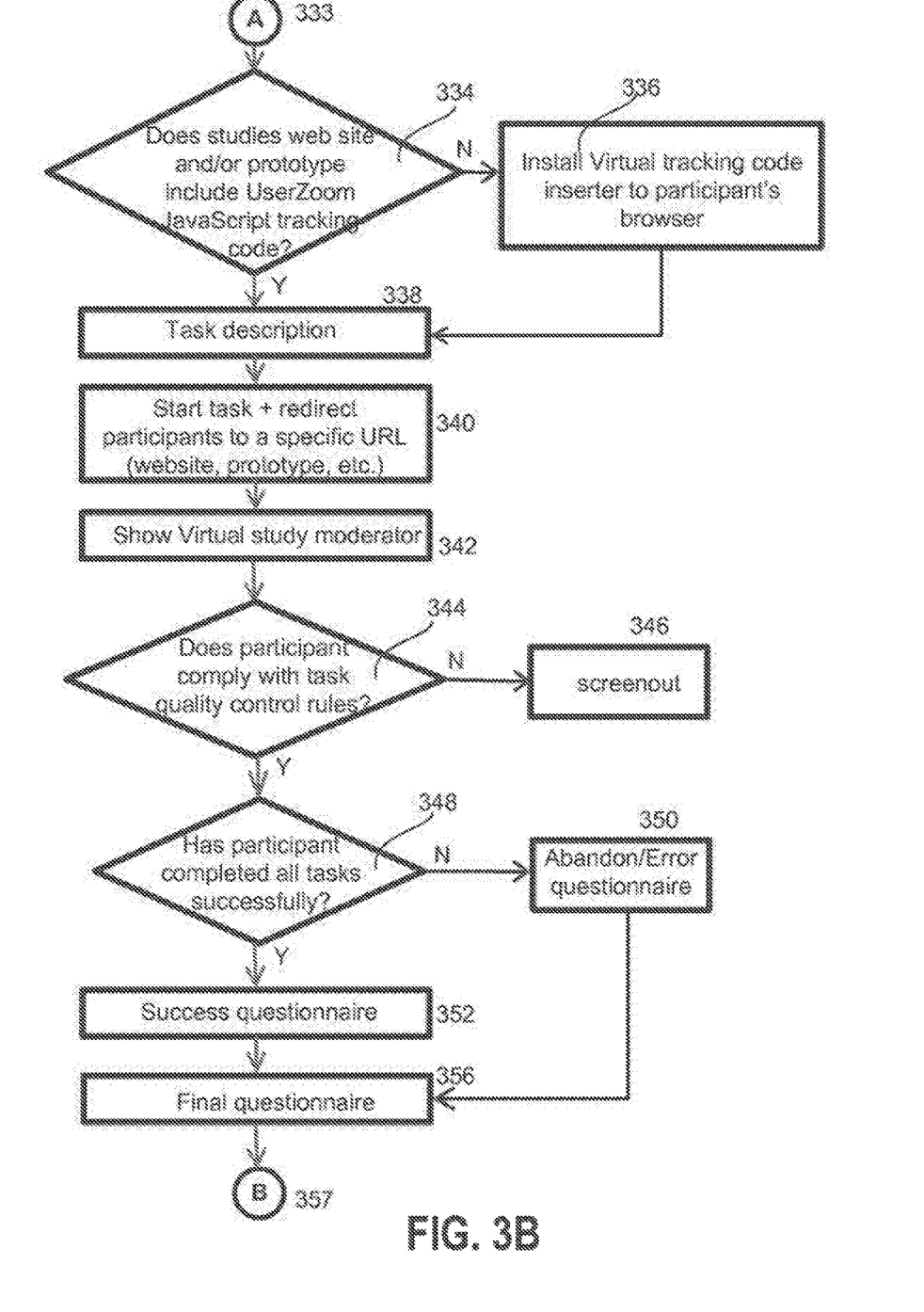
FIG. 3B is a flow diagram of an exemplary process for collecting usability data of a target web site according to an embodiment of the present invention.

FIG. 3B is a flow diagram of an exemplary process for gathering usability data of a target web site according to an embodiment of the present invention. At step 334, the target web site under test will be verified whether it includes a proprietary tracking code. In an embodiment, the tracking code is a UserZoom JavaScript code that pop-ups a series of tasks to the pre-screened participants. If the web site under study includes a proprietary tracking code (this corresponds to the scenario shown in FIG. 1C), then the process proceeds to step 338. Otherwise, a virtual tracking code will be inserted to participants' browser at step 336. This corresponds to the scenario described above in FIG. 1A.

The following process flow is best understood together with FIG. 2. At step 338, a task is described to participants. The task can be, for example, to ask participants to locate a color printer below a given price. At step 340, the task may redirect participants to a specific web site such as eBay, HP, or Amazon.com. The progress of each participant in performing the task is monitored by a virtual study moderator at step 342. At step 344, responses associated with the task are collected and verified against the task quality control rules. The step 344 may be performed by the data collecting module 260 described above and shown in FIG. 2. Data collecting module 260 ensures the quality of the received responses before storing them in a behavioral database 270 (FIG. 2). Behavioral database 270 may include data that the client and/or user experience researcher want to determine such as how many web pages a participant viewed before selecting a product, how long it took the participant to select the product and complete the purchase, how many mouse clicks and text entries were required to complete the purchase and the like. A number of participants may be screened out (step 346) during step 344 for not complying with the task quality control rules and/or the number of participants may be required to go over a series of training provided by the virtual moderator module 230. At step 348, virtual moderator module 230 determines whether or not participants have completed all tasks successfully. If all tasks are completed successfully (e.g., participants were able to find a web page that contains the color printer under the given price), virtual moderator module 230 will prompt a success questionnaire to participants at step 352. If not, then virtual moderator module 230 will prompt an abandon or error questionnaire to participants who did not complete all tasks successfully to find out the causes that lead to the incompletion. Whether participants have completed all task successfully or not, they will be prompted a final questionnaire at step 356.

Figure 3C:
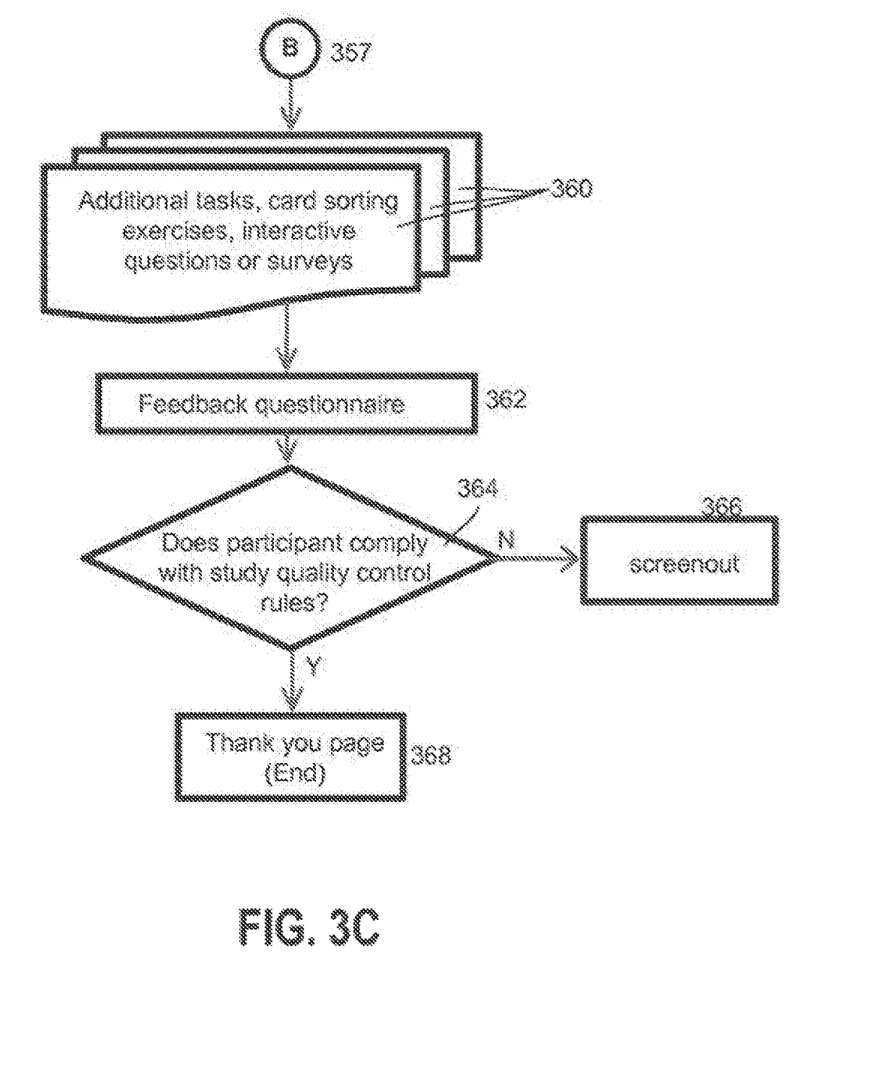
FIG. 3C is a flow diagram of an exemplary process for card sorting studies according to an embodiment of the present invention.

FIG. 3C is a flow diagram of an exemplary process for card sorting studies according to one embodiment of the present invention. At step 360, participants may be prompted with additional tasks such as card sorting exercises. Card sorting is a powerful technique for assessing how participants or visitors of a target web site group related concepts together based on the degree of similarity or a number of shared characteristics. Card sorting exercises may be time consuming. In an embodiment, participants will not be prompted all tasks but only a random number of tasks for the card sorting exercise. For example, a card sorting study is created within 12 tasks that is grouped in 6 groups of 2 tasks. Each participant just needs to complete one task of each group. It should be appreciated to one person of skill in the art that many variations, modifications, and alternatives are possible to randomize the card sorting exercise to save time and cost. Once the card sorting exercises are completed, participants are prompted with a questionnaire for feedback at step 362. The feedback questionnaire may include one or more survey questions such as a subjective rating of target web site attractiveness, how easy the product can be used, features that participants like or dislike, whether participants would recommend the products to others, and the like. At step 364, the results of the card sorting exercises will be analyzed against a set of quality control rules, and the qualified results will be stored in the behavioral database 270. In an embodiment, the analyze of the result of the card sorting exercise is performed by a dedicated analytics server 280 that provides much higher performance than general-purpose servers to provide higher satisfaction to clients. If participants complete all tasks successfully, then the process proceeds to step 368, where all participants will be thanked for their time and/or any reward may be paid out. Else, if participants do not comply or cannot complete the tasks successfully, the process proceeds to step 366 that eliminates the non-compliant participants.

Figure 4:
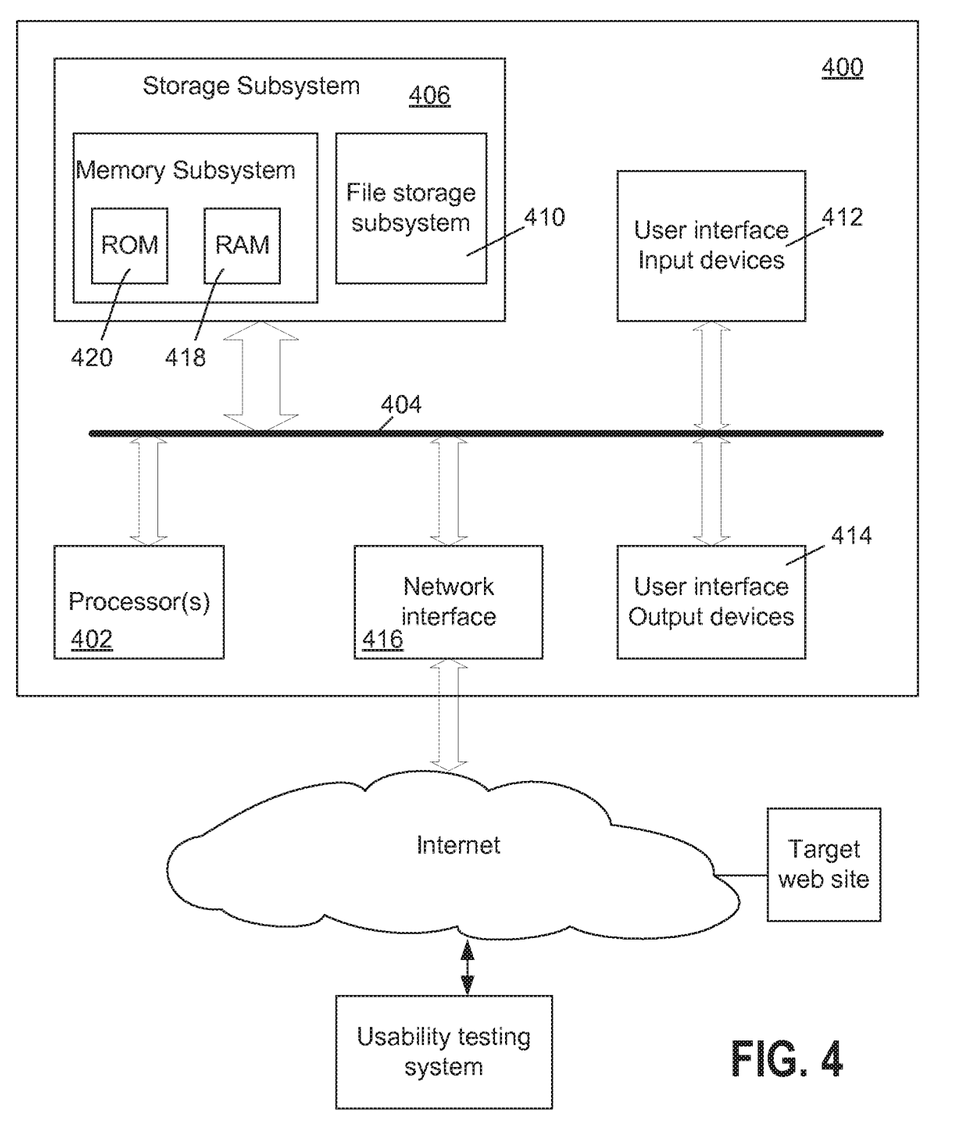
FIG. 4 is a simplified block diagram of a data processing unit configured to enable a participant to access a web site and track participant's interaction with the web site according to an embodiment of the present invention.

FIG. 4 illustrates an example of a suitable data processing unit 400 configured to connect to a target web site, display web pages, gather participant's responses related to the displayed web pages, interface with a usability testing system, and perform other tasks according to an embodiment of the present invention. System 400 is shown as including at least one processor 402, which communicates with a number of peripheral devices via a bus subsystem 404. These peripheral devices may include a storage subsystem 406, including, in part, a memory subsystem 408 and a file storage subsystem 410, user interface input devices 412, user interface output devices 414, and a network interface subsystem 416 that may include a wireless communication port. The input and output devices allow user interaction with data processing system 402. Bus system 404 may be any of a variety of bus architectures such as ISA bus, VESA bus, PCI bus and others. Bus subsystem 404 provides a mechanism for enabling the various components and subsystems of the processing device to communicate with each other. Although bus subsystem 404 is shown schematically as a single bus, alternative embodiments of the bus subsystem may utilize multiple busses.

User interface input devices 412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term input device is intended to include all possible types of devices and ways to input information to processing device. User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information from the processing device.

Storage subsystem 406 may be configured to store the basic programming and data constructs that provide the functionality in accordance with embodiments of the present invention. For example, according to one embodiment of the present invention, software modules implementing the functionality of the present invention may be stored in storage subsystem 406. These software modules may be executed by processor(s) 402. Such software modules can include codes configured to access a target web site, codes configured to modify a downloaded copy of the target web site by inserting a tracking code, codes configured to display a list of predefined tasks to a participant, codes configured to gather participant's responses, and codes configured to cause participant to participate in card sorting exercises. Storage subsystem 406 may also include codes configured to transmit participant's responses to a usability testing system.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method comprising:
receiving, at a participant computing system over a communication link, a target web site;
accessing, at the participant computing system, a plurality of codes, wherein the plurality of codes include a virtual tracking code, a task display code, a response collection code, and a card-sorting redirection code, wherein the task display code includes a plurality of tasks associated with the target web site that are displayed to a user on the participant computing system, and wherein the plurality of tasks includes at least one card sorting study for optimizing an architecture and a layout of the target web site, the at least one card sorting stud being randomized to save time and cost;
inserting, at the participant computing system, the plurality of codes to the target web site to generate a modified target web site;
displaying, at the participant computing system, the modified target web site;
receiving, at the participant computing system, participant activities for the modified target web site;
automatically collecting, by the response collection code at the participant computing system, the participant activities that are associated with the plurality of tasks;
transmitting, by the virtual tracking code from the participant computing system, the participant activities to a remote computing system; and
transmitting, by the virtual tracking code from the participant computing system, a usability rating of the target web site to the remote computing system, and wherein the usability rating is based on usability metrics derived from survey question responses related to ease of navigation, ease of finding a product, webpage layout, appearance, ease of use, likability, recommendability and connection speed associated with the participant activities.

2. The method of claim 1, further comprising:
displaying, by the virtual tracking code at the participant computing system, one or more participant questions;

receiving, by the virtual tracking code at the participant computing system, one or more participant responses to the displayed participant questions; and transmitting, by the virtual tracking code from the participant computing system, the received participant responses to the remote computing system.

3. The method of claim 1, further comprising displaying, by the virtual tracking code at the participant computing system, instructions for performing the plurality of tasks.

4. The method of claim 1, wherein automatically collecting the participant activities comprises associating a portion of the participant activities with each of the plurality of tasks.

5. The method of claim 1, wherein the participant activities comprise a mouse click event, a page-scrolling event, a new page event, and a new web site event, or a time on one of the plurality of tasks.

6. The method of claim 1, further comprising:

receiving, by the virtual tracking code at the participant computer, one or more updates to the plurality of tasks;

automatically collecting, by the virtual tracking code at the participant computing system, the participant activities that are associated with the updated plurality of tasks; and transmitting, by the virtual tracking code from the participant computing system, the participant activities that are associated with the updated plurality of tasks to a remote computing system.

7. A computer program product on a non-transitory storage medium, which when executed on a computer system causes the following steps to occur:

receiving, at a participant computing system over a communication link, a target web site;

accessing, at the participant computing system, a plurality of codes, wherein the plurality of codes include a virtual tracking code, a task display code, a response collection code, and a card-sorting redirection code, wherein the task display code includes a plurality of tasks associated with the target web site that are displayed to a user on the participant computing system, and wherein the plurality of tasks includes at least one card sorting study for optimizing an architecture and a layout of the target web site, the at least one card sorting study being randomized to save time and cost;

inserting, at the participant computing system, the plurality of codes to the target web site to generate a modified target web site;

displaying, at the participant computing system, the modified target web site;

receiving, at the participant computing system, participant activities for the modified target web site;

automatically collecting, by the response collection code at the participant computing system, the participant activities that are associated with the plurality of tasks;

transmitting, by the virtual tracking code from the participant computing system, the participant activities to a remote computing system; and transmitting, by the virtual tracking code from the participant computing system, a usability rating of the target web site to the remote computing system, and wherein the usability rating is based on usability metrics derived from survey question responses related to ease of navigation, ease of finding a product, webpage layout, appearance, ease of use, likability, recommendability and connection speed associated with the participant activities.

8. The computer program product of claim 7, further performing:

displaying, by the virtual tracking code at the participant computing system, one or more participant questions;

receiving, by the virtual tracking code at the participant computing system, one or more participant responses to the displayed participant questions; and transmitting, by the virtual tracking code from the participant computing system, the received participant responses to the remote computing system.

9. The computer program product of claim 7, further performing displaying, by the virtual tracking code at the participant computing system, instructions for performing the plurality of tasks.

10. The computer program product of claim 7, wherein automatically collecting the participant activities comprises associating a portion of the participant activities with each of the plurality of tasks.

11. The computer program product of claim 7, wherein the participant activities comprise a mouse click event, a page-scrolling event, a new page event, and a new web site event, or a time on one of the plurality of tasks.

12. The computer program product of claim 7, further performing:

receiving, by the virtual tracking code at the participant computer, one or more updates to the plurality of tasks;

automatically collecting, by the virtual tracking code at the participant computing system, the participant activities that are associated with the updated plurality of tasks; and transmitting, by the virtual tracking code from the participant computing system, the participant activities that are associated with the updated plurality of tasks to a remote computing system.

* * * * *